C. G. FILZER.
BLOW TORCH.
APPLICATION FILED NOV. 19, 1913.

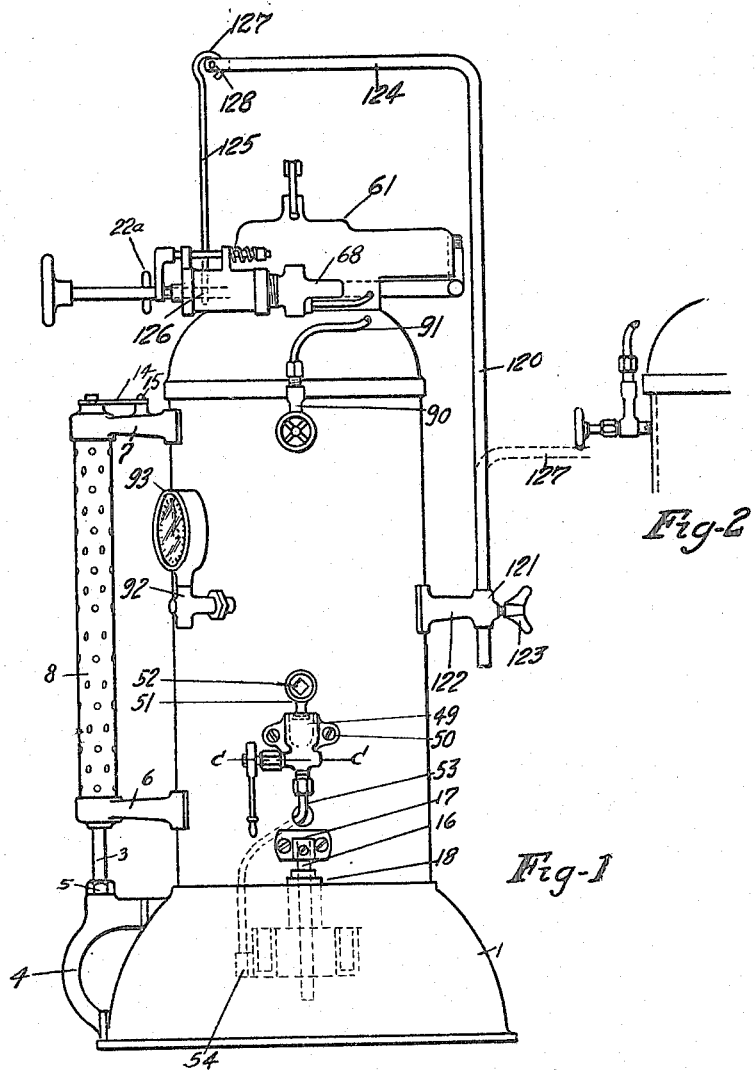

1,135,367.

Patented Apr. 13, 1915.

4 SHEETS—SHEET 2.

WITNESSES:

INVENTOR.

BY

ATTORNEY.

C. G. FILZER.
BLOW TORCH.
APPLICATION FILED NOV. 19, 1913.

1,135,367.

Patented Apr. 13, 1915.
4 SHEETS—SHEET 4.

WITNESSES:
B. M. Hartman
Mrs. D. Brugger

INVENTOR.
Christian G. Filzer
BY
ATTORNEY.

UNITED STATES PATENT OFFICE.

CHRISTIAN G. FILZER, OF ERIE, PENNSYLVANIA.

BLOW-TORCH.

1,135,367.  Specification of Letters Patent.  Patented Apr. 13, 1915.

Application filed November 19, 1913. Serial No. 801,816.

*To all whom it may concern:*

Be it known that I, CHRISTIAN G. FILZER, a citizen of the United States, residing at Erie, in the county of Erie and State of Pennsylvania, have invented new and useful Improvements in Blow-Torches, of which the following is a specification.

This invention relates to blow torches and consists in certain improvements in the construction thereof as will be hereinafter fully described and pointed out in the claims.

More particularly the invention relates to that type of blow torch wherein a vapor ordinarily a product from gasolene is supplied under pressure. Such a torch is shown in the patent issued to me Jan. 6th, 1903 #717,831.

The invention is illustrated in the accompanying drawings as follows:—

Figures 3, 4:
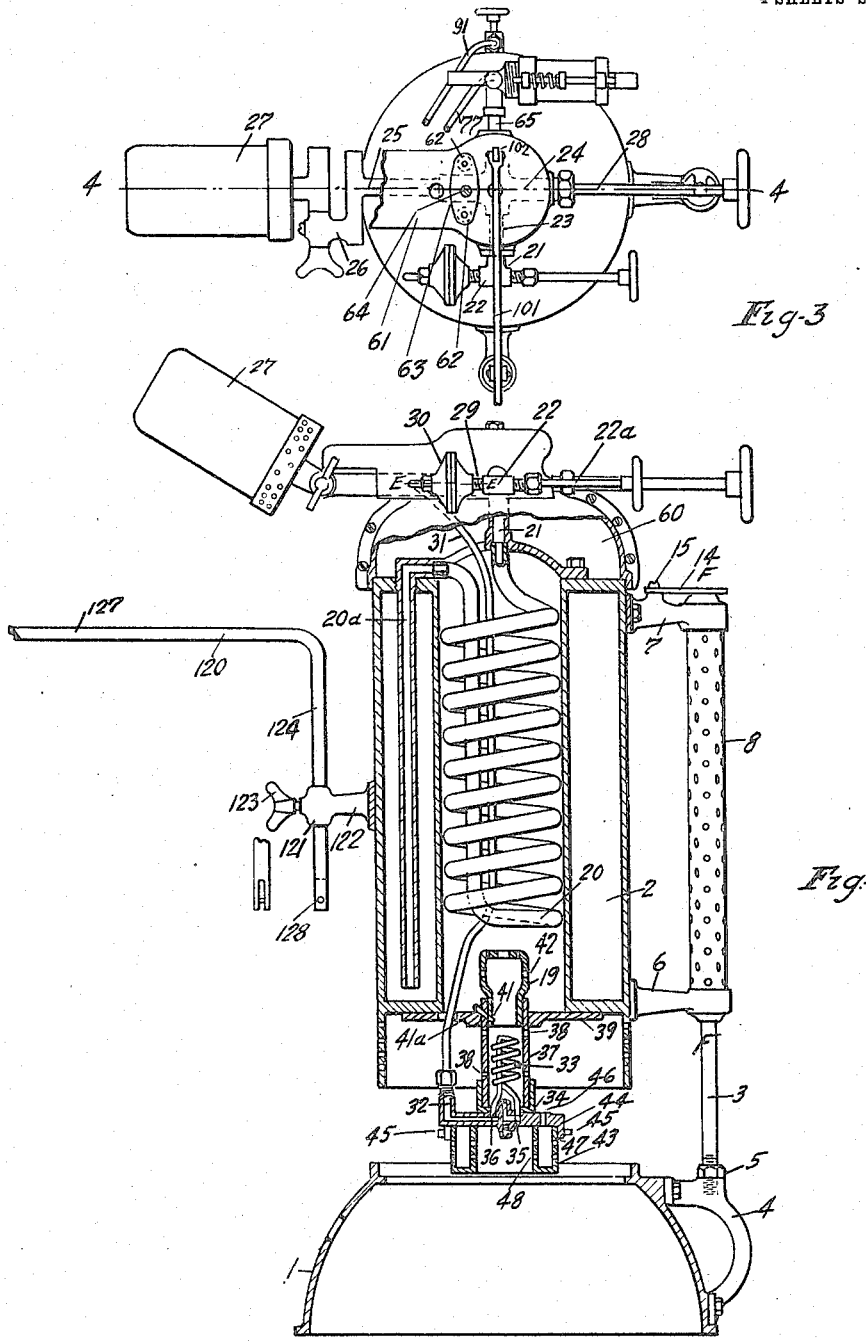
Figure 5:
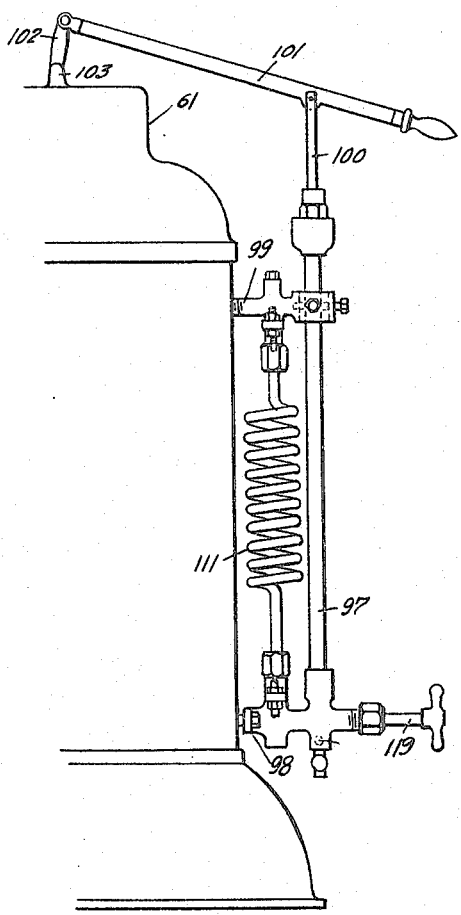
Figure 6:
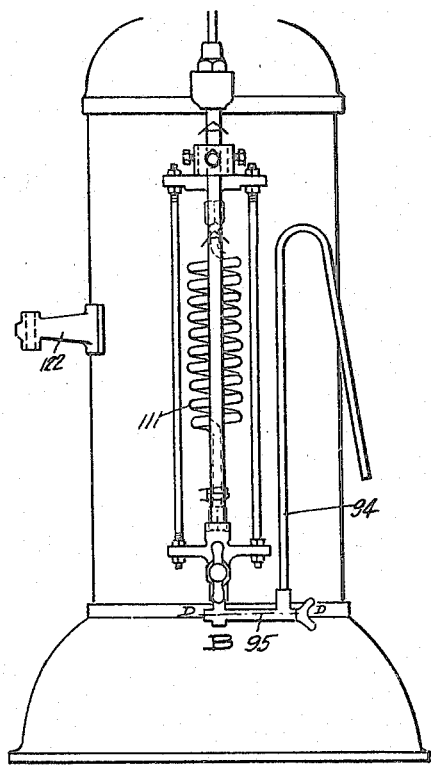
Figure 7:
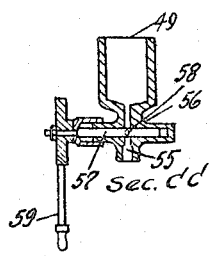
Figure 8:
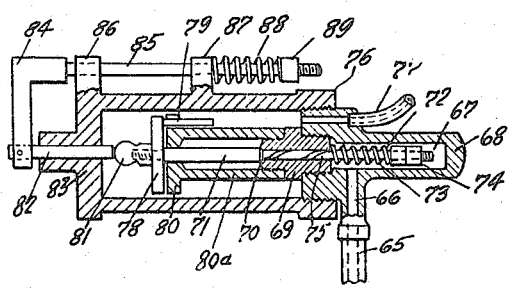
Figure 10:
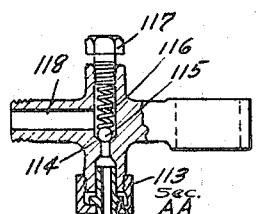
Figure 9:
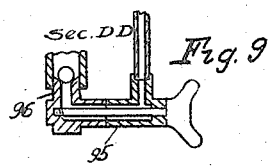
Figure 12:
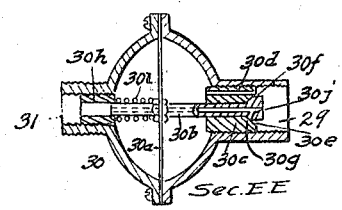
Figure 14:
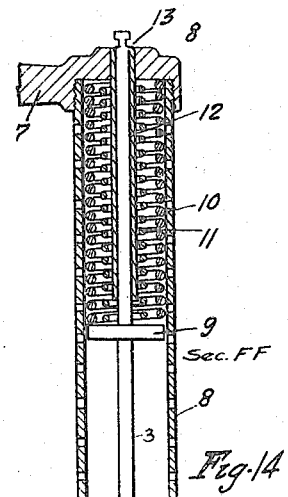
Figure 11:
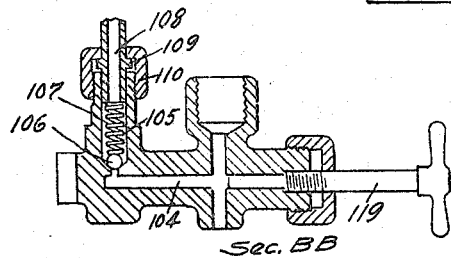
Figure 15:
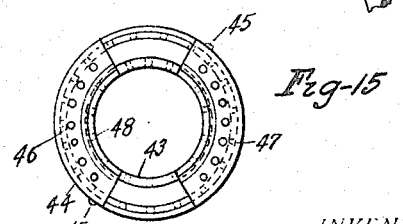

Figure 1 shows a side elevation of the torch. Fig. 2 a fragment of the torch showing the blow-off valve. Fig. 3 a plan view of the torch. Fig. 4 a section on the line 4—4 in Fig. 3. Fig. 5 a fragment of the torch showing the pump and its connections. Fig. 6 an elevation from the right of Fig. 5. Fig. 7 a vertical section on the line C—C in Fig. 1 showing the charging device for the starting burner. Fig. 8 a central vertical section of the safety valve. Fig. 9 a vertical section on the line D—D in Fig. 6; Fig. 10 a section showing the upper end of the connections leading to the fuel reservoir, the section being on the line A—A in Fig. 6. Fig. 11 shows a section on the line B—B in Fig. 6 illustrating the connections leading from the pump. Fig. 12 a section of the regulator. Fig. 13 a section of a peek-hole construction for observing the auxiliary burner. Fig. 14 a section on the line F—F in Fig. 4 of the handle and torch lifting mechanism. Fig. 15 a plan view of the burner base.

1 marks the base of the torch and 2 the fuel reservoir. A supporting upright 3 is screwed into the bracket 4 on the base. It is locked in position by a jam nut 5. The rod 3 extends through brackets 6 and 7 extending from the fuel reservoir. The handle 8 is formed of a perforated pipe and secured between the brackets 6 and 7. A shoulder 9 (see Fig. 14) is arranged on the rod 3 within the handle 8. Springs 10 and 11 one nested in the other are arranged between the shoulder 9 and the bracket 7 and are arranged to exert pressure upwardly on the bracket 7 so as to lift the fuel reservoir and attached parts from the base so that the parts of the torch may be readily accessible. A guide sleeve 12 extends downwardly from the bracket 7 so that as the handle is raised it is guided on the upper part of the rod 3. Locking notches 13 are cut in the upper end of the rod 3 and the latch 14 is pivotally connected at 15 on the bracket 7. By swinging the latch 14 into the notches 13 the fuel reservoir and attached parts may be locked in their normal or lower position. In order to prevent the fuel reservoir swinging on the rod 3 when it is in its elevated position I provide the rod 16 which is carried by a bracket 17 on the side of the fuel reservoir. The rod 16 extends through the guide 18 on the base and is of sufficient length to permit the upward movement of the reservoir without passing out of the guide 18. In this way the fuel reservoir is maintained in its central position.

A burner 19 is arranged within the fuel reservoir 2 which is preferably in the form of an annular chamber. Heat from the burner generates pressure in the fuel reservoir and liquid is forced by way of the pipe 20ª into the coil 20 where it is highly heated and converted into vapor. The vapor passes into the fitting 21 and thence by the fitting 22 (see Fig. 4) fitting 23 (see Fig. 3) fitting 24, pipe 25, joint fitting 26 to the burner 27, the joint 26 allowing the burner to be swung to any desired position. The valve 28 extends into the fitting 24 and is arranged to cut off the flow of fuel from the fitting 24 to the pipe 25 and so cut off the fuel from the burner.

The pipe 29 extends from the fitting 22. A valve 22ª controls the passage from the fitting 22 to the pipe 29. The pipe 29 leads to a regulator 30. The pipe 31 extends from the regulator to a passage 32 in the base 34 of the auxiliary burner. A heating coil 33 is connected with the passage 32 and discharges into a passage 35 leading to a jet opening 36, the jet opening extending upwardly and centrally through the coil 33. A mixer pipe 37 surrounds the coil 33, burner and jet opening 36. It has air openings 38. The pipe 37 is screwed into the bottom plate 39 closing the bottom of the combustion chamber within the walls of the annular chamber 2. The burner 19 slips into the upper end of the pipe 37 and is locked in position therein by a pin 41 which extends through the pipe 37 and burner 19. The pin 41 also extends into a slot 41ª in the plate 39 and this prevents the turning of the burner or parts with relation to the fuel reservoir. The burner 19 has the usual burner openings 42. It will be readily seen that when the parts are operating normally vapor is taken from the main supply by way of the pipe 29, regulator 30, pipe 31 and burner passages 32 to the burner, the vapor being reheated in the coil 33 and the pipe 31 extending within the chamber 2 so as to maintain the fuel in the form of vapor. In this way the generating coil 20 is heated from the vapor generated by that coil.

The regulator 30 is intended to automatically maintain a desired pressure in the generating coil by controlling the flow of fuel to the auxiliary burner. This is shown in detail in Fig. 12. The regulator case has the centrally located diaphragm 30ª. A tube 30ᵇ extends through the diaphragm and through a bushing 30ᶜ in the inlet side of the case 30. The bushing 30ᶜ has an opening 30ᵈ which opens to the inlet pipe 29 so that the generating pressure is at all times on the diaphragm 30ª. The bushing 30ᶜ has the valve seat 30ᵉ and the tube 30ᵇ has a valve surface 30ᶠ adapted to close on the seat 30ᵉ. An opening 30ᵍ extends into the side of the tube 30ᵇ. The outlet end of the tube 30ᵇ extends into a bushing 30ʰ. A spring 30ⁱ is tensioned against the bushing 30ʰ and the diaphragm 30ª. When the pressure on the inlet side of the diaphragm becomes reduced the spring 30ⁱ forcing the diaphragm toward the inlet side forces the valve surface 30ᶠ off the seat 30ᵉ and uncovers the opening 30ᵍ so that vapor can pass through the opening 30ᵍ tube 30ᵇ to the outlet. When, however, the pressure in the generator rises above normal it operates on the diaphragm 30ª so as to overcome the spring 30ⁱ and thus close the valve or partially close it so as to reduce the action of the auxiliary burner. It is preferable to have a small opening 30ʲ leading into the tube of sufficient size to maintain a flame in the burner 19 so that it will not be entirely extinguished.

In order to start the torch it is necessary to initially heat the generator so as to get some pressure in the fuel chamber. To accomplish this I have provided the following devices:—A starting burner cup 43 is secured within the flange 44 on the base plate 34 of the burner. The screws 45 extending through the flange are used for this purpose. The base plate has a series of openings 46 forming burner jets for the burner cup. The burner cup has radial openings 47 and 48 in the exterior and interior walls respectively of the cup. These air openings preferably form a Bunsen burner for the gasolene delivered to the cup so that a hot fire is produced the flame extending from the jet openings 46. As indicated in Fig. 1 the burner cup and base of the burner are housed in the base 1 when the torch is in use.

I have provided a device for charging the starting cup. It consists of the measuring cup 49 which is secured by screws 50 to the side of the fuel receptacle. Gasolene is drawn by way of the valve 51 from the fuel receptacle 2, the valve being provided with a key opening 52 whereby it may be operated with a key. The pipe 53 leads from the cup 49 to the fitting 54 leading to the bottom of the starting cup. A way 55 is arranged in the bottom of the cup 49 and the valve body 56 extends each side of this way containing a valve plug 57. The valve plug 57 has the way 58 which when turned in register with the way 55 opens a connection with the cup 49 and the pipe 53. A handle 59 is secured to the end of the plug 57 and is of sufficient weight and so located that when released it drops to a vertical position carrying with it the plug 57 so as to turn the plug 57 to closed position and thus close the valve. This is important in a structure of this kind in that if the gasolene is delivered from the fuel receptacle and allowed to run freely to the cup a sufficient quantity may be introduced to give trouble by overflowing to the base. The cup 49 holds just a sufficient amount to properly charge the starting cup 43 and with this charging sufficient fuel is supplied to accomplish the initial heating of the parts so that vapor is produced to operate the auxiliary burner. The combustion chamber formed within the annular receptacle 2 discharges to a dome 60. A housing 61 is secured to the top of the dome 60, the housing extending over the connections leading from the generator to the burner and extending to the side next the burner so that the heated gases from the auxiliary burner coming from the combustion chamber and dome 60 are carried out through this housing along the connections so as to keep these connections hot thus keeping the vapor in a more gaseous form. It is desirable to be able to observe the flame in the auxiliary burner in order that the burner may be properly adjusted. To this end I provide the peek-holes 62 in the top of the housing through which the burner 19 may be viewed by way of the dome and combustion chamber. I provide the closure plate 63 for these openings the closure plate being preferably of spring metal and pivoted at 64 a point midway between the openings so when swung on the pivot it may be moved to cover or uncover the openings as desired. By forming the cover of spring metal it will remain in its adjusted position.

It is desirable to have a safety valve for devices of this character and I have provided a special valve for this purpose. The pipe 65 extends from the generator chamber 20 by way of fitting 21 to the inlet passage 66 of the safety valve. The inlet passage leads to a chamber 67 in a body 68. The seat nipple 69 is screwed into the end of the chamber 67 and forms a closure for the valve opening. The valve 70 seats on the nipple 69 and has a stem 71 extending from it. The valve also has a stem 72 extending through the nipple. A spring 73 is arranged around the stem 72 and between the nipple and the nut 74. The spring may be adjusted by the nut 74 so as to exert more or less pressure on the valve. The stem 72 is provided with a way 75 which forms an opening through which vapor may pass when the valve 70 is off the seat. It will be observed that the area of the stem 72 of the valve is subjected to vapor pressure and when this pressure is sufficient to overcome the opposing spring the safety valve is opened.

A housing 76 is screwed onto the body 68 so that the vapor escaping from the valve 70 when the safety valve is opened is discharged to this housing 76. A pipe 77 leads from this housing and is so directed that the vapor escaping is discharged in such proximity to the burner as to be taken up and burned with the vapor in the burner. This is desirable both from the fact that this vapor gives some heat at the burner and also in that it affords safety in that this inflammable gas is disposed of.

It is also desirable to prevent the rotation of the valve so that a tight fit may be more readily maintained. A shoulder 78 is arranged on the stem 71. This has a key pin 79 which extends through the flange 80 in an open frame 80ª secured to the nipple.

It is also desirable to be able to change the resistance to the opening of the safety valve to have this adjustable part exposed so as to be readily operated, in fact it is desirable to be able to operate this so as to cut off the exhaust temporarily when the safety valve acts.

A head 81 is arranged on the stem 71 and contacts a sliding rod 82 extending through the head 83 of the housing 76. An arm 84 is secured to the rod 82 and to the rod 85 and communicates the movement of the rod 82 to a rod 85 which extends through the ears 86 and 87 on the housing 76. A spring 88 is arranged on the rod 85 and the nut 89 on the rod 85 is provided for adjusting the tension of the spring. It will be observed that the nut 89 is in position to be readily turned by the operator so as to vary the strength of the spring 88 and this may be instantly done, that is, may be done while the safety valve is blowing off so as to close it temporarily.

In order to reduce the pressure in the fuel reservoir or generator at times when desired, I provide a blow-off valve 90 and this has the discharge pipe 91 leading to a position and so directed as to discharge vapor so as to be taken up by the burner and burned with the vapor from the burner. The pressure gage 93 is connected with the fuel reservoir by a fitting 92 so that the pressure in the fuel reservoir and generator may be observed. An inverted U tube 94 is provided so that gasolene may be readily pumped from an open receptacle. This connects with a fitting 95 (see Fig. 6) the fitting extending through a check valve 96 (see Fig. 9) and leading to the pump barrel 97. The pump barrel is carried by the fitting 95 which is secured to a bracket 98 on the side of the fuel receptacle and by the fitting 99 which is also secured to the fuel receptacle. The pump plunger 100 is attached to the handle 101. The handle is fulcrumed through the link 102 in a post 103 at the top of the housing 61. The fitting 95 has a way 104 below the pump barrel leading to a vertical passage 105. A check 106 is arranged at the bottom of the passage 105 and the spring 107 is arranged on the check. The upper end of the spring is anchored against the bottom of the pipe 108. The pipe has a shoulder 109 and a pipe joint is formed by the flange nut 110 engaging the shoulder and the upright part of the fitting 95. The pipe 108 leads into a coil 111 and the upper end of the pipe leading from the coil has a shoulder 112 which is engaged by a flange nut 113 and so secured to the fitting 99. The fitting 99 has the valve seat 114 on which a check 115 operates. A spring 116 acts on the check. A screw 117 forms the upper base for the spring. A passage 118 leads through the fitting 99 to the fuel receptacle.

The coil 111 forms a condensing chamber so that if the vapor passes the check 115 it will be condensed in the coil and will reach the check 106 in the form of a liquid. The vapor is very difficult to hold but liquid is comparatively a simple matter so that the back-flow of fuel is thus prevented. The coil also gives such elasticity to the connection between the fitting 95 and the fitting 99 as to make it possible to readily maintain tight joints. A rod 120 is slidingly mounted in the sleeve 121 in the bracket 122, the bracket extending from the wall of the fuel reservoir. A set screw 123 is provided for locking the rod in place. The rod 120 has a right angle bend 124. A link 125 is provided with a hook 126 which may be placed around the stem of the valve 28 or other part of the top of the device. The upper end of the link 125 is provided with a hook 127 which extends over a pin 128 in the bend 124. With the rod arranged in this position it forms a handle by which the device may be carried. When the torch is in use the bend 124 is passed through the sleeve 121 and the other arm 127 of the rod 120 is then extended in a horizontal direction and forms a rest for a fire back if desired.

What I claim as new is:—

1. In a blow torch, the combination of an annular fuel reservoir; a generator in the chamber formed within the inner walls of the reservoir; a main burner connected with the generator; an auxiliary burner for heating the generator connected with the generator; and a mixer for said auxiliary burner, said mixer being concentric with the annular chamber.

2. In a blow torch, the combination of an annular fuel reservoir; a generator in the chamber formed within the inner walls of the reservoir; a main burner connected with the generator; an auxiliary burner for heating the generator connected with the generator; a mixer for said auxiliary burner, said mixer being concentric with the annular chamber; and a starting cup below the auxiliary burner and mixer.

3. In a blow torch, the combination of an annular fuel reservoir; a generator in the chamber formed within the inner walls of the reservoir; a main burner connected with the generator; an auxiliary burner for heating the generator connected with the generator; a starting cup below the auxiliary burner; and a base on which the fuel reservoir and generator are mounted, said base forming a housing for the starting cup.

4. In a blow torch, the combination of a fuel reservoir; a generator connected with the fuel reservoir; a main burner connected with the generator; an auxiliary burner for heating the generator and reservoir connected with the generator; and a starting cup for initially heating the device, said starting cup having outer and inner walls with air openings therein.

5. In a blow torch, the combination of a fuel reservoir; a generator connected with the fuel reservoir; a main burner connected with the generator; an auxiliary burner for heating the generator and reservoir connected with the generator; said burner having a perforated base; and a starting cup secured below the burner and leading to the perforations in the base, said starting cup having outer and inner walls with air openings therein.

6. In a blow torch, the combination of an annular fuel reservoir; a generator in the chamber formed within the inner walls of the reservoir; a main burner connected with the generator; an auxiliary burner for heating the generator connected with the generator; and a starting cup for initially heating the device, said starting cup having outer and inner walls with air openings therein.

7. In a blow torch, the combination of an annular fuel reservoir; a generator connected with the fuel reservoir and arranged in the chamber formed by the inner walls of the reservoir; a main burner connected with the generator; an auxiliary burner for heating the generator and reservoir connected with the generator, the base of the burner having openings therein; and a starting cup arranged below said openings and having outer and inner vertical walls with air openings therein.

8. In a blow torch, the combination of a fuel reservoir; a generator connected with the fuel reservoir; a main burner connected with the generator; an auxiliary burner for heating the generator and reservoir connected with the generator; a starting cup for initially heating the device; a charging device for the starting cup comprising a charging receptacle adapted to measure the charge for the cup; and a connection leading from the charging receptacle to the cup.

9. In a blow torch, the combination of a fuel reservoir; a generator connected with the fuel reservoir; a main burner connected with the generator; an auxiliary burner for heating the generator and reservoir connected with the generator; a starting cup for initially heating the device; a charging device for the starting cup comprising a charging receptacle adapted to measure the charge for the cup; a connection leading from the charging receptacle to the cup; and a valve controlling the connection.

10. In a blow torch, the combination of a fuel reservoir; a generator connected with the fuel reservoir; a main burner connected with the generator; an auxiliary burner for heating the generator and reservoir connected with the generator; a starting cup for initially heating the device; a charging device for the starting cup comprising a charging receptacle adapted to measure the charge for the cup; a connection leading from the charging receptacle to the cup; a valve controlling the connection; and means for automatically closing the valve.

11. In a blow torch, the combination of a burner; a charging receptacle; a starting cup adjacent to the burner; a connection leading from the charging receptacle to the cup; a valve in the connection having a way therein opening and closing by a turning of the valve; and a weighted handle for the valve, the handle being arranged with relation to the way to close the valve when released.

12. In a blow torch, the combination of a fuel reservoir; a generator connected with the fuel reservoir; a main burner connected with the generator; an auxiliary burner for heating the generator and reservoir connected with the generator; a starting cup for initially heating the device; a charging device for the starting cup comprising a charging receptacle adapted to measure the charge for the cup; a connection leading from the charging receptacle to the cup; and a valve connection leading from the fuel reservoir and discharging into the charging receptacle.

13. In a blow torch, the combination of an annular fuel reservoir; a generator within the chamber formed within the inner walls of the fuel reservoir; a main burner connected with the generator; an auxiliary burner connected with the generator arranged at the bottom of the chamber within the walls of the fuel reservoir; a mixer for the auxiliary burner arranged concentrically with the fuel reservoir; and a heating coil arranged within the mixer for heating the vapor leading to the auxiliary burner.

14. In a blow torch, the combination of a fuel reservoir; a generator connected with the fuel reservoir; a main burner connected with the generator; an auxiliary burner connected with the generator and adapted to heat the generator; and an automatic pressure regulator in the connection between the generator and the auxiliary burner.

15. In a blow torch, the combination of a fuel reservoir; a generator connected with the fuel reservoir; a main burner connected with the generator; an auxiliary burner connected with the generator and adapted to heat the generator; and an automatic pressure regulator in the connection between the generator and the auxiliary burner, said regulator varying the flow of fuel to the auxiliary burner inversely as the pressure in the generator varies.

16. In a blow torch, the combination of a fuel reservoir; means for heating the reservoir; means for forcing fuel to the fuel reservoir; connections between said means and the reservoir comprising an upper and lower check valve; and a condenser between said check valves comprising a coil.

17. In a blow torch, the combination of a generator in which combustible vapor is put under pressure; a safety valve connected with the generator comprising a valve controlling part subjected to the generator pressure; an inclosed spring opposing the generator pressure; an outer spring also opposing the movement of the valve under generator pressure; and means for adjusting the outer spring.

18. In a blow torch, the combination of a generator in which combustible vapor is put under pressure; a safety valve connected to the generator comprising a valve moving in an axial direction toward and from its seat; a part operating on the valve subjected to generator pressure; a spring opposing the generator pressure for holding the valve in closed position; and means for locking the valve against rotation.

19. In a blow torch, the combination of a generator in which combustible vapor is put under pressure; a safety valve connected with the generator comprising a valve moving in an axial direction toward and from its seat; a part operating said valve subjected to generator pressure; an inclosed spring opposing the movement of the valve; an exterior spring also opposing the movement of the valve; and means for adjusting the exterior spring.

20. In a blow torch, the combination of a generator in which combustible vapor is put under pressure; a safety valve comprising a compression chamber connected with the generator; a valve nipple leading to the compression chamber; a valve slidingly mounted in the nipple; a spring in the compression chamber; an exposed rod connected with the safety valve; a spring on the exposed rod; and means for adjusting the spring on said exposed rod.

21. In a blow torch, the combination of a fuel reservoir; a generator connected with the reservoir; means for heating the generator; a burner connected with the generator; a safety valve connected with the generator; and a discharge pipe leading from the safety valve to deliver the discharge vapors in position to be burned with the vapors from said burner.

22. In a blow torch, the combination of a receptacle in which fuel is vaporized by heat; a base on which the receptacle is mounted; means between the receptacle and base for heating the receptacle, said means being accessible when the receptacle is elevated relatively to the base; a rod extending upwardly from the base; a handle for the device surrounding the rod, said handle being telescopically mounted on the rod; and a plurality of springs one nested within another arranged within the handle and exerting upward pressure from the rod to the handle.

23. In a blow torch, the combination of a receptacle in which fuel is vaporized by heat; a base on which the receptacle is mounted; means between the receptacle and base for heating the receptacle, said means being accessible when the receptacle is elevated relatively to the base; a rod extending upwardly from the base and having a telescopic connection with the parts attached to the receptacle whereby the receptacle and attached parts may be lifted relatively to the base with said rod as a guide; a second rod having a telescopic connection between the base and parts mounted thereon for locking the parts mounted on the base for maintaining the parts on the base in vertical alinement with the base.

24. In a blow torch, the combination of an annular fuel reservoir; a generator arranged within the chamber formed by the annular fuel reservoir; a main burner; connections leading from the generator to the main burner; an auxiliary burner below the generator; and a housing extending laterally along the connections between the generator and main burner and directing the heated gases from the auxiliary burner along said connections.

25. In a blow torch, the combination of an annular fuel reservoir; a generator arranged within the chamber formed by the annular fuel reservoir; a main burner; connections leading from the generator to the main burner; an auxiliary burner below the generator; a housing extending along the connections between the generator and main burner and directing the heated gases from the auxiliary burner along said connections, said housing having a plurality of openings for observing the action of the auxiliary burner, said openings being grouped around a common center; and a spring plate pivoted at said center for closing said openings and adapted to be moved to and from said openings to cover or uncover the same.

26. In a blow torch, the combination of a fuel reservoir; a generator connected with the fuel reservoir; a burner connected with the generator; a rod having two arms at right angles to each other; and a sleeve bracket attached to the fuel reservoir through which said rod may be extended said rod extending above the device and forming a carrying handle when turned with one arm in the bracket and forming a rest with the opposite arm in said bracket.

27. In a blow torch, the combination of a fuel reservoir; a generator connected with the fuel reservoir; a burner connected with the generator; a rod having two arms at right angles to each other; a sleeve bracket attached to the fuel reservoir through which said rod may be extended, said rod extending above the device and forming a carrying handle when turned with one arm in the bracket and forming a rest with the opposite arm in said bracket; and a link for connecting the arm with a part of the device when used as a handle.

In testimony whereof I have hereunto set my hand in the presence of two subscribing witnesses.

CHRISTIAN G. FILZER.

Witnesses:
B. M. HARTMAN,
H. C. LORD.

Copies of this patent may be obtained for five cents each, by addressing the "Commissioner of Patents, Washington, D. C."